United States Patent
Gupta et al.

(10) Patent No.: US 12,511,730 B2
(45) Date of Patent: Dec. 30, 2025

(54) META-LEARNING FOR DETECTING OBJECT ANOMALY FROM IMAGES

(71) Applicant: X Development LLC, Mountain View, CA (US)

(72) Inventors: Ananya Gupta, San Francisco, CA (US); Phillip Ellsworth Stahlfeld, Mountain View, CA (US); Kshitij Naresh Nikhal, Lincoln, NE (US); Om Prakash Ravi, Sammamish, WA (US); Aviva Cheryl Shwaid, Santa Monica, CA (US); Arthur Robert Pope, Palo Alto, CA (US); Xinyue Li, San Mateo, CA (US)

(73) Assignee: X Development LLC, Mountain View, CA (US)

( * ) Notice: Subject to any disclaimer, the term of this patent is extended or adjusted under 35 U.S.C. 154(b) by 400 days.

(21) Appl. No.: 18/160,276

(22) Filed: Jan. 26, 2023

(65) Prior Publication Data

US 2023/0237644 A1    Jul. 27, 2023

Related U.S. Application Data

(60) Provisional application No. 63/303,173, filed on Jan. 26, 2022.

(51) Int. Cl.
*G06K 9/00* (2022.01)
*G06T 7/00* (2017.01)
(Continued)

(52) U.S. Cl.
CPC ............... *G06T 7/001* (2013.01); *G06T 7/11* (2017.01); *G06V 10/82* (2022.01);
(Continued)

(58) Field of Classification Search
CPC .. G06T 7/001; G06T 7/11; G06T 2207/20081; G06T 2207/20084;
(Continued)

(56) References Cited

U.S. PATENT DOCUMENTS 11,068,752 B2 * 7/2021 Bian ................... G06V 10/774
2007/0217676 A1 * 9/2007 Grauman ............. G06V 10/764
                                                          382/190

(Continued)

FOREIGN PATENT DOCUMENTS

| CA | 3063580 A1 * | 6/2020 | ............. G06F 18/23 |
| CN | 106372724 A * | 2/2017 | ............... G06N 3/08 |
| CN | 107784661 A * | 3/2018 | ............. G06T 7/187 |

OTHER PUBLICATIONS

A Method of Insulator Faults Detection in Aerial Images for High-Voltage Transmission Lines Inspection, Jiaming Han et al., MDPI, 2019, pp. 1-22 (Year: 2019).*

(Continued)

*Primary Examiner* — Jayesh A Patel
(74) *Attorney, Agent, or Firm* — Fish & Richardson P.C.

(57) ABSTRACT

Methods, computer systems, and apparatus, including computer programs encoded on computer storage media, for training a classification neural network. The system generates, from a set of object-specific data, one or more meta-learning datasets for one or more respective initial training tasks. The system determines values for a set of meta parameters by performing meta-learning with a classification neural network on the one or more meta-learning datasets. The system obtains a set of labeled training examples for a characteristic-detection task. The system determines based at least on one of the values for the set of meta parameters and using the set of labeled training examples, target values for the network parameters for the
(Continued)

classification neural network to perform the characteristic-detection task.

20 Claims, 6 Drawing Sheets

(51) Int. Cl.
    *G06T 7/11*         (2017.01)
    *G06V 10/82*      (2022.01)

(52) U.S. Cl.
    CPC .............. *G06T 2207/20081* (2013.01); *G06T 2207/20084* (2013.01); *G06T 2207/20132* (2013.01)

(58) Field of Classification Search
    CPC ......... G06T 2207/20132; G06T 7/0004; G06T 7/73; G06V 10/82
    See application file for complete search history.

(56) References Cited

U.S. PATENT DOCUMENTS

| | | | | |
|---|---|---|---|---|
| 2008/0097936 | A1* | 4/2008 | Schmidtler | G06N 20/10 706/12 |
| 2019/0065901 | A1* | 2/2019 | Amato | G06F 18/24133 |
| 2021/0232947 | A1* | 7/2021 | Sasaya | G06N 3/08 |
| 2022/0121878 | A1* | 4/2022 | Butler | G06V 10/774 |
| 2022/0147879 | A1* | 5/2022 | Rowan | G06N 20/00 |
| 2022/0189209 | A1* | 6/2022 | Song | G06V 10/761 |
| 2022/0253630 | A1* | 8/2022 | Shekhar | G06N 7/01 |

OTHER PUBLICATIONS

MetaSearch: Incremental Product Search via Deep Meta-Learning, Qi Wang et al., IEEE, 2020, pp. 7549-7564 (Year: 2020).*
High Voltage Insulator Surface Evaluation Using Image Processing, Damira Pernebayeva et al., ISEIM, 2017, pp. 520-523 (Year: 2017).*
Semi-ProtoPNet Deep Neural Network for the Classification of Defective Power Grid Distribution Structures, Stefano Frizzo Stefenon et al., 2022, pp. 1-18 (Year: 2022).*
Detection of Insulator Defects With Improved ResNeSt and Region Proposal Network, Shuqing Wang et al., IEEEAccess, 2020, pP. 184841-184850 (Year: 2020).*
Insulator Detection in Aerial Images for Transmission Line Inspection Using Single Shot Multibox Detector, Xiren Miao et al., IEEEAccess, 2019, pp. 9945-9956 (Year: 2019).*
Search Like an Eagle: A Cascaded Model for Insulator Missing Faults Detection in Aerial Images, Jiaming Han et al., MDPI, Feb. 2020, pp. 1-20 (Year: 2020).*
An Improved Method Based on Deep Learning for Insulator Fault Detection in Diverse Aerial Images, Jingjing Liu et al., MDPI, Jul. 2021, pp. 1-19 (Year: 2021).*
Condition Assessment of High Voltage Insulator using Convolutional Neural Network, Satyajit Panigrahy et al., IEEE, 2021, pp. 1-6 (Year: 2021).*
Deep Learning Image-Based Defect Detection in High Voltage Electrical Equipment, Irfan Ullah et al., MDPI, Jan. 2020, pp. 1-17 (Year: 2020).*
Automatic Vision Based Fault Detection On Electricity Transmission Components Using Very Highresolution Imagery and Deep Learning Model, Joel Dinis Baptista Ferreira da Silva et al., Feb. 2021, pp. Vi-46 (Year: 2021).*
Detection of Power Line Insulator Defects Using Aerial Images Analyzed With Convolutional Neural Networks, Xian Tao et al., IEEE, Apr. 2020, pp. 1486-1498 (Year: 2020).*
Duan et al., "CenterNet: Keypoint Triplets for Object Detection," Proceedings of the IEEE/CVF International Conference on Computer Vision (ICCV), 2019, pp. 6569-6578.
Nichol et al., "On First-Order Meta-Learning Algorithms," CoRR, Mar. 8, 2018, arXiv:1803.02999, 15 pages.
Energycentral.com [online], "Third of utility workforce reaching retirement age soon," Jan. 29, 2017, retrieved on Aug. 3, 2021, retrieved from URL <https://energycentral.com/news/third-utility-workforce-reaching-retirement-age-soon>, 9 pages.

* cited by examiner

META-LEARNING FOR DETECTING OBJECT ANOMALY FROM IMAGES

CROSS-REFERENCE TO RELATED APPLICATION

This application claims priority to U.S. Provisional Patent Application No. 63/303,173, filed on Jan. 26, 2022, the disclosure of which is hereby incorporated by reference in its entirety.

FIELD

This specification generally relates to obtaining a machine-learning model for detecting object anomaly from images, and in particular, to using meta-learning to train an object anomaly detection machine-learning model based on a limited quantity of labeled data.

BACKGROUND

Automatically detecting object characteristic features, e.g., detecting object defects from sensor data, may be applicable in many contexts. For example, detecting defects in electrical assets in the electric power grid is important for maintaining the safe operation of the electric power grid. Examples of these defects include broken or cracked crossarms, bent poles, damaged transformers, etc. Spotting these defects from images (e.g., street photos) of the pole-top electrical assets is difficult for untrained workers and can be costly and time-consuming. It is desirable to have machine-learning models to automatically detect these defects from the images.

However, developing such anomaly detection machine-learning models can be hampered by a lack of training data. For example, images that depict electrical assets with defects are not common in available image datasets. In order to obtain a training dataset with adequate numbers of training examples for each category of asset and asset defects, a large number of images need to be labeled by human experts, which is extremely costly and time-consuming.

SUMMARY

This specification describes methods, computer systems, and apparatus, including computer programs encoded on computer storage media, for a training classification neural network using meta-learning. The classification neural network can be used to classify objects according to characteristics of the objects, such as whether a particular object is associated with an anomaly or another pre-defined characteristic. In a particular example, the classification neural network is used to perform an anomaly detection task. The system utilizes a visual similarity search model to identify similar features in a set of images. Based on the visual similarity search result, the system generates one or more meta-learning datasets for one or more initial training tasks that are not identical to the anomaly detection task. The system performs meta-learning for a classification neural network on the initial training tasks to learn the differences between objects, in preparation for training the classification neural network on an anomaly detection task. In this approach, the system extracts prior knowledge from the initial training tasks, which allows efficient learning of the anomaly detection tasks on limited labeled data.

In one particular example, the system aims to train a classification neural network to detect defects in electrical assets from sensor data, such as images. The system uses an object detection model to process a plurality of images to select and crop images for each of a plurality of types of electrical assets, such as transformers, poles, capacitors, and cross-arms. Next, to tackle the problem of limited labeled data, the system can use a visual similarity search model to process the cropped images to identify visually similar images for each type of electrical asset. One or more meta-learning datasets can then be generated for one or more respective initial training tasks from the visually similar images. Each initial training task is a task to classify the images based on a feature that is different from an anomaly feature (or a defect) for the electrical asset. For example, from images of a transformer, an initial training task may be to differentiate between transformers with and without cooling fins. Unlike defect features such as a bulge or a burn mark on the exterior of the transformer, the visibility of cooling fins is not an anomaly feature, but they are a distinction between variations in a common object—in this case, variations in a transformer. The system performs meta-learning that trains the classification neural network on the initial training datasets for the respective initial training tasks, in preparation for training the classification neural network for the anomaly detection task on a labeled dataset of defect features.

The system can use an appropriate meta-learning algorithm to update the parameters of the classification neural network based on training for the initial training tasks and the anomaly detection task. In particular, the system can adopt a scalable meta-learning algorithm ("Reptile") that repeatedly samples a task, performs stochastic gradient descent on the task, and updates the initial parameters towards the final parameters learned on that task.

In one innovative aspect, this specification describes a method for training a classification neural network. The method is implemented by a system including one or more computers.

The system generates, from a set of object-specific data, one or more meta-learning datasets for one or more respective initial training tasks. To generate each meta-learning dataset for the respective initial training task, the system generates similarity measures by performing a similarity search on the set of object-specific input data. The system selects from the set of object-specific input data, based on the similarity measures, at least a first sub-set of object-specific data each representing an object having a first feature and a second sub-set of object-specific data each representing an object having a second feature. The system generates, for each object-specific datum in the first sub-set of object-specific data, a first label indicating that the object represented in the object-specific datum belongs to a first classification, and generates, for each object-specific datum in the second sub-set of object-specific input data, a second label indicating that the object represented in the object-specific datum belongs to a second classification. The system also determines values for a set of meta parameters by performing meta-learning with a classification neural network on the one or more meta-learning datasets.

The system obtains a set of labeled training examples for a characteristic-detection task. Each labeled training example includes a training input and a label indicating at least whether an object represented in the training input has a characteristic feature. The system determines based at least on one of the values for the set of meta parameters and using the set of labeled training examples, target values for the network parameters for the classification neural network to perform the characteristic-detection task.

In some implementations of the method, the set of object-specific data includes a set of object-specific images, where each object specific image depicts the particular type of object. To generate the similarity measures, the system performs a visual similarity search on the set of object-specific images.

In some implementations of the method, the set of object-specific data includes a set of object-specific audio recordings, where each object-specific audio recording includes operating sound of the particular type of object. To generate the similarity measures, the system performs the similarity search on the time-domain or frequency-domain data of the set of object-specific audio recordings.

In some implementations of the method, the system further processes an image using the classification neural network according to the target network parameters to generate a classification result indicating whether an object depicted by the image is associated with one or more anomaly features.

In some implementations of the method, the first feature and the second feature are different from the anomaly features, and the particular type of object is an electrical asset, and the characteristic feature includes one or more defects on the electrical asset.

In some implementations of the method, the defects include: a broken wire, a broken or cracked cross-arm, a bent pole, a damaged or rusty transformer, a damaged insulator, a damaged fuse, or a damaged lightning arrestor.

In some implementations of the method, the particular type of object is: a utility pole, a cross-arm, an insulator, a lightning arrestor, a transformer, a fuse cutout, a primary wire, a ground wire, a neutral wire, a guy wire, or a telephone and cable wire.

In some implementations of the method, the particular type of object is a utility pole, the first classification indicates a utility pole having a single cross-arm, and the second classification indicates a utility pole having two cross-arms.

In some implementations of the method, the particular type of object is a utility pole, the first classification indicates an un-rotated utility pole having a single cross-arm, and the second classification indicates a utility pole having a single cross-arm and rotated 90 degrees in the object-specific image.

In some implementations of the method, the particular type of object is a utility pole, the first classification indicates an un-rotated utility pole having a single cross-arm, and the second classification indicates a utility pole having a single cross-arm and rotated 270 degrees in the object-specific image.

In some implementations of the method, the particular type of object is a utility pole, the first classification indicates an un-rotated utility pole having two cross-arms, and the second classification indicates a utility pole having two cross-arms and rotated 90 degrees in the object-specific image.

In some implementations of the method, the particular type of object is a utility pole, the first classification indicates an un-rotated utility pole having two cross-arms, and the second classification indicates a utility pole having two cross-arms and rotated 270 degrees in the object-specific image.

In some implementations of the method, the particular type of object is a utility pole, the first classification indicates a straight utility pole, and the second classification indicates a bent utility pole.

In some implementations of the method, the particular type of object is a utility pole, the first classification indicates an un-rotated straight utility pole, and the second classification indicates a straight utility pole rotated 180 degrees in the object-specific image.

In some implementations of the method, the particular type of object is a utility pole, the first classification indicates an un-rotated bent utility pole, and the second classification indicates a bent utility pole rotated 180 degrees in the object-specific image.

In some implementations of the method, the particular type of object is a transformer, the first classification indicates a transformer having cooling fins, and the second classification indicates a transformer without cooling fins.

In some implementations of the method, the particular type of object is a transformer, the first classification indicates an un-rotated transformer having cooling fins, and the second classification indicates a transformer having cooling fins and rotated 180 degrees in the object-specific image.

In some implementations of the method, the particular type of object is a transformer, the first classification indicates an un-rotated transformer without cooling fins, and the second classification indicates a transformer without cooling fins and rotated 180 degrees in the object-specific image.

In some implementations of the method, the system further selects the set of object-specific images from a plurality of images based on a detection result generated by processing each of the plurality of images using an object detection model configured to at least detect the particular type of object from an input image.

In some implementations of the method, where the plurality of images includes one or more aerial photos.

In some implementations of the method, where the plurality of images includes street view photos.

In some implementations of the method, where the object detection model is further configured to generate a cropped image that contains the particular type of object from an input image.

In some implementations of the method, to generate the similarity measures by performing the visual similarity search on the set of object-specific images, the system generates a respective feature vector for each object-specific image by processing the object-specific image using a feature extraction neural network, and computes the similarity measures as distance metrics between pairs of the respective feature vectors of the object-specific images in a feature space.

In some implementations of the method, the distance metrics are cosine similarities.

In some implementations of the method, to select the first sub-set and the second sub-set of object-specific images from the set of object-specific images, the system identifies, from the set of object-specific images, a plurality of object-specific images with respective feature vectors having distance metrics from a first feature vector below a first threshold as the first set of object-specific images, and identifies, from the set of object-specific images, a plurality of object-specific images with respective feature vectors having distance metrics from a second feature vector below a second threshold as the second set of object-specific images. The distance metric between the first feature vector and the second feature vector is above a third threshold.

In some implementations of the method, to determine the values for the set of meta parameters, the system updates values of the network parameters of the classification neural network by training the classification neural network on a plurality of training examples from the one or more meta-learning datasets; and determines the values of the set of meta parameters based at least on the updated values of the network parameters.

In some implementations of the method, the set of meta parameters are initialization parameters for the classification neural network. To generate the target values for the network parameters, the system initializes the network parameters with the values of the meta parameters determined by the meta-learning, updates the values of the network parameters by training the classification neural network on the set of labeled training examples, and determines the target values for the network parameters using the updated values of the network parameters after performing training of the classification neural network on the set of labeled training examples.

In some implementations of the method, to determine values for the set of meta parameters, the system initializes the meta parameters to initial values; and for each of a plurality of training iterations, performs: selecting a task from the initial training tasks, initializing the set of network parameters to current values of the meta parameters, performing a plurality of training steps, including, for each training step, updating the values of the network parameters based on a first batch of training examples from the meta-learning dataset for the selected task, evaluating a loss using the classification neural network and in accordance with the updated values of the network parameters on a second batch of training examples from the meta-learning dataset of the selected task, and updating the current values of the meta parameters based on the loss with respect to the meta parameters; and determines the values for the set of meta parameters as the updated values of the meta parameters after performing the plurality of training iterations.

In some implementations of the method, to perform meta-learning of the classification neural network to update the set of meta parameters, the system assigns initial values to the meta parameters; and for each of a plurality of training episodes, performs: selecting a task from the initial training tasks, assigning values of the set of network parameters to current values of the meta parameters, performing a plurality of training steps, including, for each training step, updating the values of the set of network parameters based on a training example from the respective meta-learning dataset of the selected task, and after performing the plurality of training steps, updating values of the meta parameters based at least on differences between the current values of the meta parameters and the updated values of the network parameters; and determines the values for the set of meta parameters as the updated values of the meta parameters after performing the plurality of training iterations.

In some implementations of the method, the classification neural network has one or more convolution layers. In some implementations of the method, the classification neural network further includes a respective head for each of the plurality of object types that generates a respective classification output for the object type. In some implementations of the method, the convolution layers include a first set of convolution layers with fixed network parameters that are not updated using the labeled training examples and a second set of convolution layers with network parameters that are updated using the labeled training examples.

In another innovative aspect, this specification describes an electrical characteristic detection method. The method is implemented by a system including one or more computers. The system obtains at least one image including a depiction of an electrical asset; processes the at least one image as input to a classification neural network to generate a classification result indicating a physical characteristic of the electrical asset; determines an electrical characteristic of the electrical asset including by correlating the physical characteristic to the electrical characteristic; and provides the electrical characteristic as output.

This specification also provides a system including one or more computers and one or more storage devices storing instructions that when executed by the one or more computers, cause the one or more computers to perform the methods described above.

This specification also provides one or more computer storage media storing instructions that when executed by one or more computers, cause the one or more computers to perform the methods described above.

The techniques described herein provide a meta-learning framework that extracts prior knowledge from the initial training tasks generated from visual similarity searches, which allows efficient learning of anomaly detection tasks on limited labeled data of anomaly features. Combined with efficient meta-learning algorithms, these techniques enable generating machine-learning models that automatically detect object anomalies from images without requiring a large number of labeled training examples with anomaly features.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes methods, computer systems, and apparatus, including computer programs encoded on computer storage media, for training a classification neural network based on limited labeled data.

Figure 1:
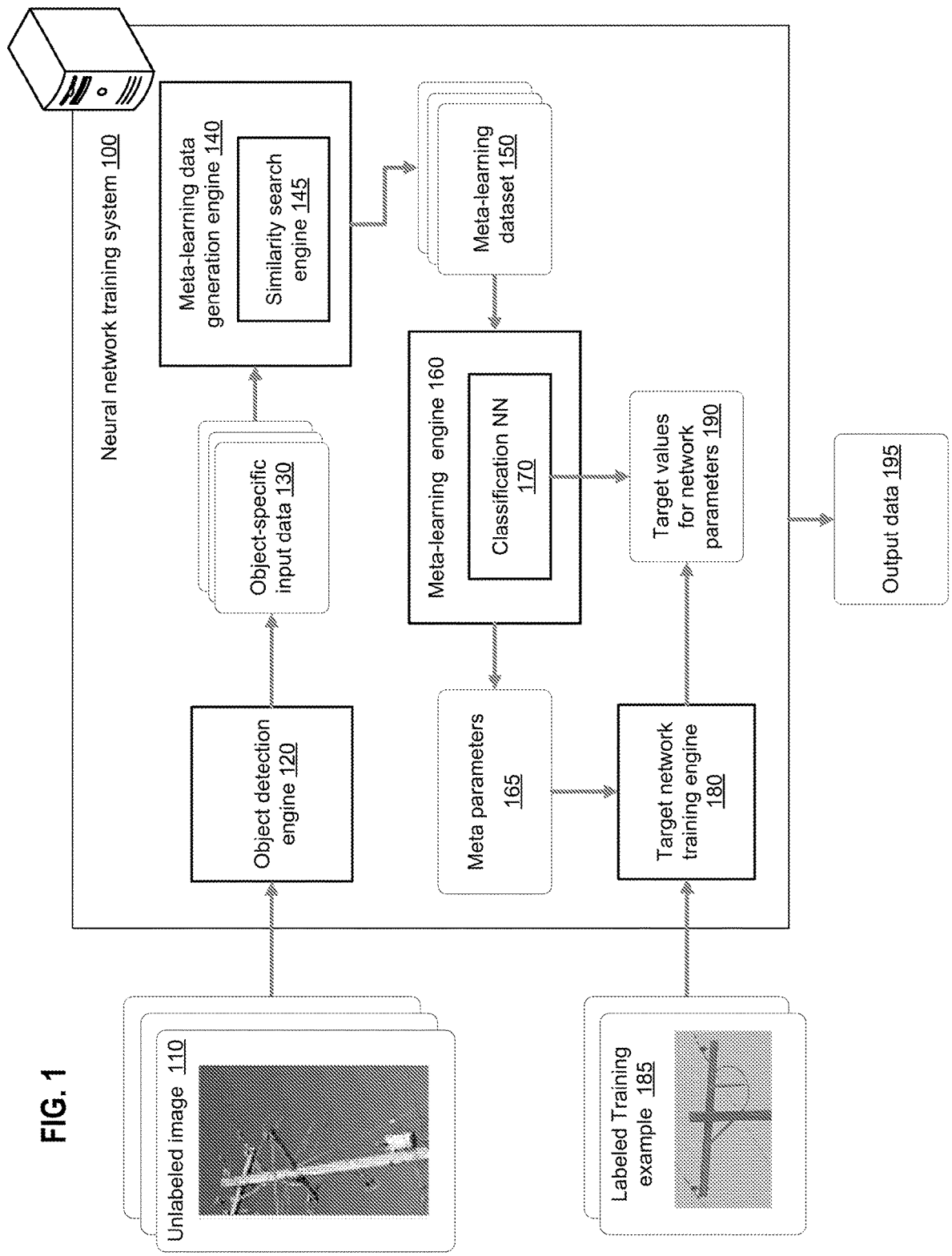
FIG. 1 shows an example of a neural network training system.

FIG. 1 shows an example of a neural network training system 100. The system 100 is an example of a system implemented as computer programs on one or more computers in one or more locations. The system 100 is an example of a system in which the techniques described below can be implemented.

In general, the system 100 trains a classification neural network 170. The classification neural network 170 is configured to process data to generate a classification result for a classification task. In particular, through the training process, the system 100 obtains a set of target values 190 for the neural network parameters, including, for example, weight and bias coefficients for the classification neural network 170.

The data can be any type of data generated from sensor measurements of an environment. For example, the sensor data can include one or more of: a street view photograph, a top-view (vertical) aerial photograph, an oblique aerial photo, point-cloud data (e.g., obtained by a LiDAR sensor), a radar image, an audio signal, a sonography, a thermal image, and so on. In one particular example, the data includes an image depicting an object. In another example, the data includes an audio recording of an operating sound of an object. In another example, the data includes a measurement of the current through and/or the voltage over an electrical equipment.

In the present specification, the term "target values" refers to the neural network parameter values for the classification neural network 170 to perform an intended classification task. For example, the intended classification task can be an anomaly detection task. That is, the classification neural network 170 is configured to process, according to the target values 190 of the neural network parameters, the data to generate the classification result that characterizes an object represented by the input data. For example, the classification result can indicate whether an object represented by the input data, e.g., an object detected in an input image, has one or more anomalies. In another example, the classification task is a characterization task. That is, the classification result can indicate whether an object depicted by the sensor data has one or more characteristics, for example, if the object belongs to a particular sub-category or has a particular feature.

In a particular example, the object represented by the sensor data is an electrical asset, such as a utility pole, a cross-arm, an insulator, a lightning arrestor, a transformer, a fuse cutout, a primary wire, a ground wire, a neutral wire, a guy wire, or a telephone and cable wire. For an anomaly detection task, the anomalies can be defects in the electrical asset, such as broken wires, broken or cracked cross-arms, bent poles, damages (e.g. shown as being deformed or as burn marks) in a transformer, an insulator, a lightning arrestor, a fuse, and so on.

For a characterization task, the classification result can indicate whether the electrical asset is of a particular sub-category or whether the electrical asset is rated for a particular specification parameter. In one particular example, the classification result can indicate whether a transformer being represented by the data is of a particular sub-category, e.g., whether it is a 2-phase transformer or a 3-phase transformer. In another example, the classification result can indicate whether an insulator has a particular level of thickness and whether the insulator is rated for a particular voltage level.

Although the following description is focused on using the classification neural network to detect whether an electric asset has a specific characteristic feature, the techniques can also be applied to perform classification or characterization of other types of objects or subjects, such as detecting defects of products in a manufacturing facility or diagnosing medical anomalies based on medical images or other biometric test results.

The classification neural network 170 can take any appropriate architecture. For example, the classification neural network 170 can include one or more convolution layers.

In some implementations, the classification neural network 170 is configured to detect characteristic features, e.g., anomalies for a single type of objects, such as a transformer, a pole, or a fuse. In some other implementations, the classification neural network is configured to detect characteristic features, e.g., anomalies for a plurality of types of objects.

Figure 2:
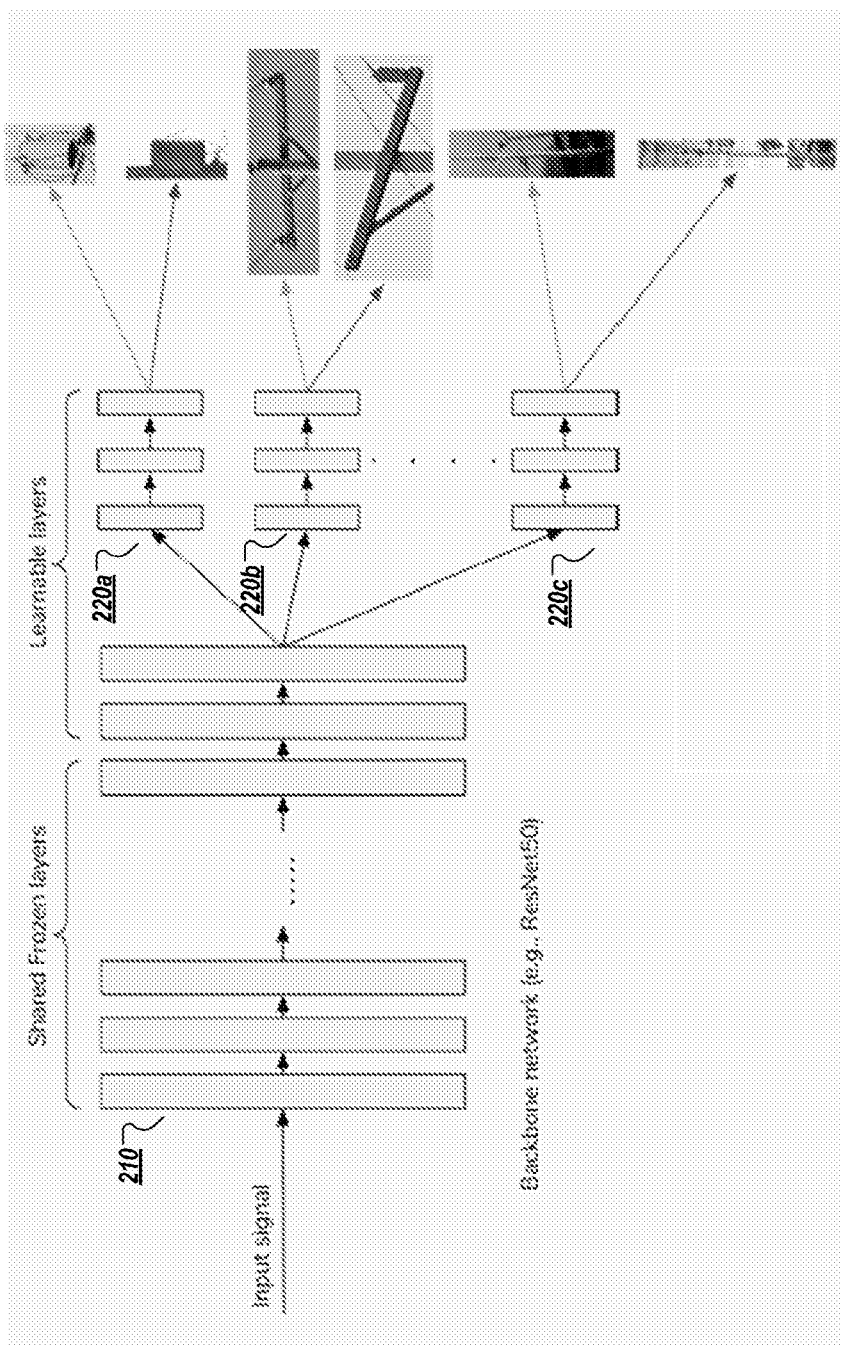
FIG. 2 shows an example architecture for a classification neural network.

An example of the classification neural network is described with reference to FIG. 2. In this example, the classification neural network 170 includes a plurality of convolution layers 210 and further includes a respective head (i.e., sub-network) for each of the plurality of object types that generates a respective classification output for the object type. As shown in FIG. 2, the classification neural network has a first head 220a for detecting anomalies in transformers, a second head 220b for detecting anomalies in cross-arms, and a third head 220c for detecting anomalies in poles.

A large number of labeled training examples are needed for training the classification neural network 170 using supervised learning. This can be challenging for certain applications. For example, few images that depict electrical asset defects are available. In order to obtain a training dataset with adequate numbers of training examples for each category of asset defects, a large number of pole images need to be labeled by human experts, which is extremely costly and time-consuming.

Instead, as described herein, the system 100 enables few-shot learning (i.e., training the classification neural network 170 using a limited number of labeled training examples) by generating initial training tasks (or pseudo tasks) and performing meta-learning of the classification neural network on the pseudo tasks to learn the differences of objects, in preparation for training the classification neural network on an anomaly detection task. In this approach, the system 100 extracts prior knowledge from the initial training tasks, which allows efficient learning of the anomaly detection tasks on limited labeled data.

The system 100 includes a meta-learning data generation engine 140 that generates one or more meta-learning datasets 150 for one or more respective initial training tasks. In particular, the meta-learning data generation engine 140 generates the meta-learning datasets 150 from a set of object-specific input data 130, where each object-specific datum depicts a particular type of object. For example, the set of object-specific data can include a set of object-specific images with each object-specific image depicting the particular type of object. In another example, the set of object-specific data includes a set of object-specific audio recordings, where each object-specific audio recording characterizes the operating sound of the particular type of object.

In some implementations, the system 100 can obtain the object-specific images using unlabeled images. In particular, the system 100 obtains a plurality of unlabeled images 110, and selects the set of object-specific images 130 from the unlabeled images 110. For example, the system 100 selects the set of object-specific images 130 based on a detection result generated by processing each of the plurality of unlabeled images 110 using an object detection engine 120 configured to at least detect the particular type of object from an input image.

For example, the plurality of unlabeled images 110 can include aerial photos and/or street view photos that have been collected for a target area. The object detection engine 120 can use an object detection model to detect electric grid assets of interest, such as a utility pole, a cross-arm, an insulator, a lightning arrestor, a transformer, a fuse cutout, a primary wire, a ground wire, a neutral wire, a guy wire, or a telephone and cable wire, from each of the unlabeled image 110. The system 100 can select the unlabeled images which the object detection engine 120 determines as depicting a particular type of object as the set of object-specific images 130. For example, the detection engine 120 can detect similar objects and groups them into object specific image sets 130. For instance, the detection engine 120 groups images of transformers separately from images of utility poles. In some implementations, the object detection engine 120 can be further configured to generate a cropped image that contains the particular type of object from an input image.

The object detection model can be any appropriate machine-learning model that has been trained to generate an object detection result. One example of such an object detection model is described in "CenterNet: Keypoint Triplets for Object Detection," Duan, et al., arXiv preprint, arXiv:1904.08189 [cs.CV], 2019.

The meta-learning data generation engine 140 is used to generate the meta-learning dataset 150 for the initial training tasks. The meta-learning data generation engine 140 includes a similarity search engine 145 that performs a similarity search on the set of object-specific data 130 to generate similarity measures for each object-specific datum 130. For example, when the object-specific data 130 are object-specific images, the system 100 can generate the similarity measures by performing a visual similarity search on the set of object-specific images. In another example, when the object-specific data 130 are object-specific audio recordings, the system 100 can generate the similarity measures by performing the similarity search on the time-domain or frequency-domain data of the set of object-specific audio recordings.

In some implementations, to generate the similarity measures, the similarity search engine 145 generates a respective feature vector for each object-specific input datum 130 by processing the object-specific input datum 130 using a feature extraction neural network, and computes the similarity measures as distance metrics between pairs of the respective feature vectors of the object-specific datum 130 in a feature space. The feature extraction neural network can have any appropriate architecture, and can be, for example, a convolution neural network. A variety of different distance metrics can be used. For example, the distance metrics can be computed as cosine similarities.

The meta-learning data generation engine 140 selects sub-sets of object-specific data 130 for the initial training task. For each initial training task, the meta-learning data generation engine 140 selects at least a first sub-set of object-specific data and a second sub-set of object-specific images from the set of object-specific data 130 based on the similarity measures. Data in the first sub-set each depict an object having a first feature and images in the second sub-set each depicts the object having a second feature. For example, the meta-learning data generation engine 140 can select two sub-sets of transformer images—the first subset including images of transformers with cooling fins and the second sub-set including images of transformers without cooling fins. In some implementations, the meta-learning data generation engine 140 can select more than two sub-sets of transformer images with each sub-set including images of transformers having a particular feature.

In some implementations, the meta-learning data generation engine 140 can select the first and second sub-sets of object-specific data by identifying object-specific data that are close to each other in the feature space. For example, the meta-learning data generation engine 140 can identify, from the set of object-specific images 130, a plurality of object-specific images with respective feature vectors having distance metrics from a first feature vector below a first threshold as the first set of object-specific images. The meta-learning data generation engine 140 further identifies, from the set of object-specific images, a plurality of object-specific images with respective feature vectors having distance metrics from a second feature vector below a second threshold as the second set of object-specific images, where the distance metric between the first feature vector and the second feature vector is above a third threshold. Thus, the first and second sub-sets of object-specific images are two separate clusters of object-specific images in the feature space.

The meta-learning data generation engine 140 further labels the selected sub-sets. That is, for each initial training task, the meta-learning data generation engine 140 generates, for each object-specific image in the first sub-set of object-specific data, a first label indicating that the object depicted in the object-specific data belongs to a first classification, and generates, for each object-specific image in the second sub-set of object-specific data, a second label indicating that the object depicted in the object-specific image belongs to a second classification.

Thus, for the initial training task, the meta-learning data generation engine 140 generates a respective meta-learning dataset 150 that includes a plurality of training examples, where each training example includes an object-specific datum and a label that indicates whether the object depicted in the object-specific image belongs to the first classification or the second classification.

In general, each initial training task aims to classify features that are not the characteristic feature to be detected in the intended application, such as an anomaly (e.g., defect) features in the object depicted in the object-specific data. Instead, the initial training task is used for the classification neural network to learn variations in normal features of the object.

In one example, the particular type of object is a utility pole. The first classification can indicate the utility pole having a single cross-arm, and the second classification can indicate the utility pole having two cross-arms. In another example, the first classification indicates an un-rotated utility pole having a single cross-arm, and the second classification indicates a utility pole having a single cross-arm and rotated 90 degrees in the object-specific image. Additional classifications can include, but are not limited to, a utility pole having a single cross-arm and rotated 270 degrees in the object-specific image; a utility pole having two cross-arms and rotated 90 degrees in the object-specific image; a utility pole having two cross-arms and rotated 270 degrees in the object-specific image; a straight utility pole; a bent utility pole; an un-rotated straight utility pole; a straight utility pole rotated 180 degrees in the object-specific image; an un-rotated bent utility pole; and a bent utility pole rotated 180 degrees in the object-specific image.

In another example, the particular type of object is a transformer. The first classification can indicate a transformer having cooling fins, and the second classification can indicate a transformer without cooling fins. In another example, the first classification indicates an un-rotated transformer having cooling fins, and the second classification indicates a transformer having cooling fins and rotated 180 degrees in the object-specific image. In another example, the first classification indicates an un-rotated transformer without cooling fins; and the second classification indicates a transformer without cooling fins and rotated 180 degrees in the object-specific image.

The meta-learning engine 160 performs meta-learning to determine values for a set of meta parameters 165 based on the meta-learning datasets 150. The meta-learning engine 160 can use any appropriate meta-learning algorithms to determine the meta parameters 165. In general, the meta-learning process includes training the classification neural network 170 on the initial training tasks to generate updated values of a set of network parameters for the classification neural network 170, and updating the set of meta parameters 165 based at least on the updated values for the network parameters. Thus, the system 100 can generate the meta parameters 165 by extracting prior knowledge from the initial training tasks based on the meta-learning datasets 150, and in a next step, use the meta parameters 165 along with labeled training examples to train the classification neural network to perform the intended classification task, i.e., the anomaly detection task.

In one example, the meta-learning engine 160 can use a model agnostic meta-learning (MAML) approach. In this approach, the meta-learning engine 160 directly optimizes the meta parameters to initialize the classification neural network 170 for adapting to a new task given a small number of labeled training examples on the new task. That is, based on the meta-learning datasets 150 for the initial training tasks, the meta-learning engine 160 optimizes a set of cross-task initiation parameters to provide the initial values for the target network parameters of the classification neural network 170. The meta parameters 165 are the cross-task initiation parameters in this case.

In an example process of MAML, the meta-learning engine 160 defines a set of initial parameters θ, and repeatedly samples a task t from the initial training tasks. For each sampled task t, the meta-learning engine 160 initializes the values of the network parameters at θ, and performs k (e.g., k<10) steps of gradient descent on a training batch of the respective meta-learning dataset 150 of task t. At the end of k steps, the values of the network parameters are updated to φ. The meta-learning engine 160 evaluates the loss on a testing batch from the respective meta-learning dataset for task t at parameter values φ, and calculates the derivative of the loss with respect to the initial parameters θ. The meta-learning engine 160 uses the derivative with respect to θ to update the initialization parameters θ, discards the φ learned for the specific task, and starts the process over again with a new sampled task, initializing the values of the network parameters with the updated θ values.

In a particular example, the meta-learning engine 160 can adopt a meta-learning algorithm ("Reptile") to efficiently computing the updated θ values. Examples and analysis of the "Reptile" algorithm are described in "On first-order meta-learning algorithms," Nichol et al., arXiv:1803.02999 [cs.LG], 2018, the entire content of which is herein incorporated by reference. Briefly, for each sampled task, the meta-learning engine 160 obtains φ, the network parameters reached after k steps of gradient descent on the task, and computes the update to the initial parameters θ based on the total movement in the parameter space over those k updates, or (□–□). This approach improves overall system efficiency by computing the updated θ without using an inner and outer loop optimization which is computationally expensive.

To train the classification neural network 170 for the intended task, the system 100 obtains a set of labeled training examples 185 for an anomaly-detection task. Each labeled training example 185 includes a training input image and a label indicating at least whether an object depicted in the training input image has an anomaly feature. In some examples the label also indicates a type of anomaly in the image.

In some implementations, the object depicted in the training input image is an electrical asset, and the anomaly feature is a defect in the electrical asset that causes malfunction or potential hazard. Examples of these defects include broken wires, broken or cracked cross-arms, bent poles, damages (e.g. shown as being deformed, as burn marks, or rust) in a transformer, an insulator, a lightning arrestor, a fuse, and so on.

The target network training engine 180 performs training of the classification neural network 170 using the labeled training examples 185 and the determined values of the meta parameters 165. That is, the target network training engine 180 determines target values 190 for the network parameters for the classification neural network 170 to perform the anomaly-classification task. For instance, the target network training engine 180 determines the target values 190 based on the values for the set of meta parameters 165 and using the set of labeled training examples 185.

In some implementations, the meta parameters 165 are initialization parameters for the classification neural network 170. To generate the target values 190 for the network parameters, the target network training engine 180 initializes the network parameters with the values of the meta parameters 165 determined by the meta-learning, updates the values of the network parameters by training the classification neural network 170 on the set of labeled training examples 185, and determines the target values 190 for the network parameters using the updated values of the network parameters after performing training of the classification neural network 170 on the set of labeled training examples. The target network training engine 180 can update the values of the network parameters through any appropriate backpropagation-based machine learning technique, e.g., using the Adam or AdaGrad optimizers.

In some implementations, as shown in FIG. 2, the classification neural network has a first set of network layers (e.g., convolution layers) with fixed network parameters that are not updated during training using the labeled training examples. That is, the target network training engine 180 keeps the initial values for these layers. Instead, the target network training engine 180 only updates the values of the network parameters for a second set of layers when training on the labeled training examples 185. In general, the fixed initial layers can extract high level features that are shared across the different objects, while the later learnable layers can extract more detailed features that would vary across different types of objects.

Referring back to FIG. 1, the system 100 can include the target values 190 for the network parameters in the output data 195. In some implementations, the system 100 can use the classification neural network 170 according to the target network parameters to perform anomaly detection. That is, the system 100 can process an image using the classification neural network according to the target network parameters to generate a classification result indicating whether an object depicted by the image is associated with the one or more anomaly features.

Figure 3A:
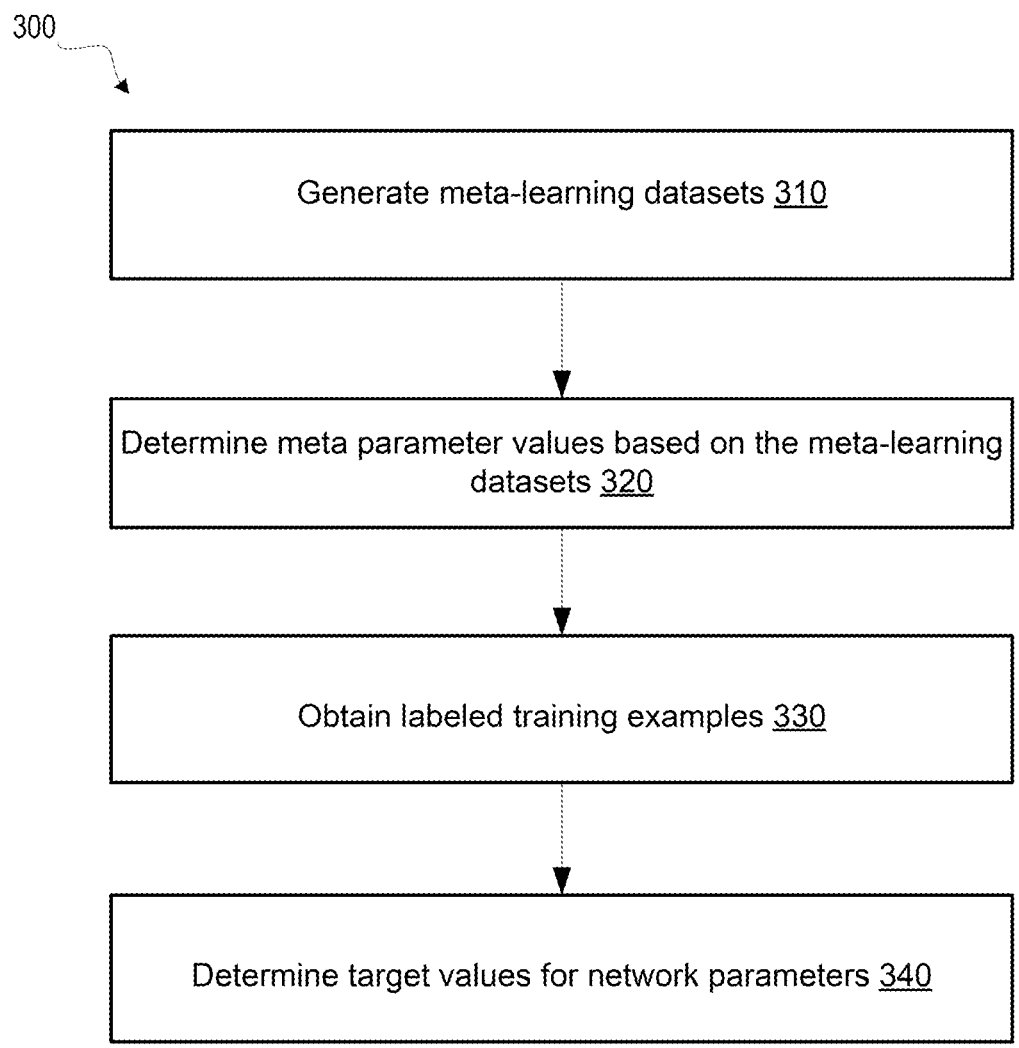
FIG. 3A is a flow diagram illustrating an example of a neural network training process.

FIG. 3A is a flow diagram illustrating an example process 300 for training a classification neural network. For convenience, the process 300 will be described as being performed by a system of one or more computers located in one or more locations. For example, a neural network training system, e.g., the neural network training system 100 of FIG. 1, appropriately programmed in accordance with this specification, can perform the process 300.

In step 310, the system generates one or more meta-learning datasets for one or more respective initial training tasks. In particular, the system generates the meta-learning datasets from a set of object-specific images, where each object-specific image depicts a particular type of object.

An example process 310A for generating the meta-learning datasets is described with reference to FIG. 3B.

Figure 3B:
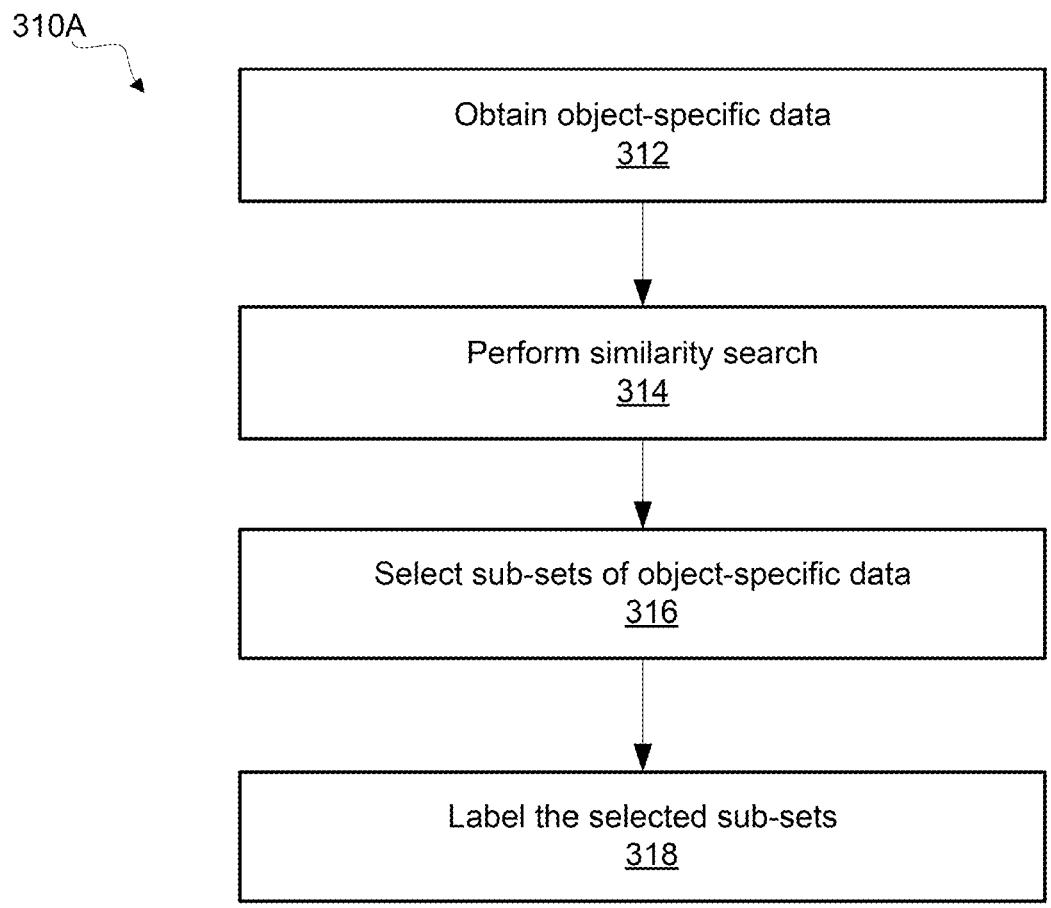
FIG. 3B is a flow diagram illustrating an example of a process for generating meta-learning datasets.

Referring to FIG. 3B, in step 312, the system obtains the object-specific data. In some implementations, the system selects the set of object-specific data from a plurality of images based on a detection result generated by processing each of the plurality of images using an object detection model configured to at least detect the particular type of object from an input image. For example, the plurality of images can include aerial photos and/or street view photos that have been collected for a target area. The system can use an object detection model to detect electric assets of interest, such as a utility pole, a cross-arm, an insulator, a lightning arrestor, a transformer, a fuse cutout, a primary wire, a ground wire, a neutral wire, a guy wire, or a telephone and cable wire.

In some implementations, the object detection model can be further configured to generate a cropped image that contains the particular type of object from an input image.

In step 314, the system performs a similarity search on the set of object-specific data to generate similarity measures for each object-specific image. In some implementations, to generate the similarity measures, the system generates a respective feature vector for each object-specific image by processing the object-specific image using a feature extraction neural network, and computes the similarity measures as distance metrics between pairs of the respective feature vectors of the object-specific images in a feature space. The feature extraction neural network can have any appropriate architecture, and can be, for example, a convolution neural network. A variety of different distance metrics can be used. For example, the distance metrics can be computed as cosine similarities.

In step 316, the system selects sub-sets of object-specific data for the initial training task. For example, for each initial training task, the system selects from the set of object-specific images, based on the similarity measures, a first sub-set of object-specific images each depicting an object having a first feature and a second sub-set of object-specific images each depicting the object having a second feature.

In some implementations, the system can select the first and second sub-sets of object-specific data by identifying object-specific images that are close to each other in the feature space. For example, the system can identify, from the set of object-specific images, a plurality of object-specific images with respective feature vectors having distance metrics from a first feature vector below a first threshold as the first set of object-specific images. The system further identifies, from the set of object-specific images, a plurality of object-specific images with respective feature vectors having distance metrics from a second feature vector below a second threshold as the second set of object-specific images, where the distance metric between the first feature vector and the second feature vector is above a third threshold. Thus, the first and second sub-sets of object-specific images are two separate clusters of object-specific images in the feature space.

In step 318, the system labels the selected sub-sets. For example, for each initial training task, the system generates, for each object-specific image in the first sub-set of object-specific images, a first label indicating that the object depicted in the object-specific image belongs to a first classification, and generates, for each object-specific image in the second sub-set of object-specific images, a second label indicating that the object depicted in the object-specific image belongs to a second classification. Thus, for the initial training task, the system generates a respective meta-learning dataset that includes a plurality of training examples, where each training example includes an object-specific image and a label that indicates whether the object depicted in the object-specific image belongs to the first classification or the second classification.

In general, each initial training task aims to classify features are not anomaly (e.g., defect) features in the object depicted in the object-specific images. Instead, the initial training task is used for the classification neural network to learn variations in normal features in the object.

In one example, the particular type of object is a utility pole. The first classification can indicate the utility pole having a single cross-arm, and the second classification can indicate the utility pole having two cross-arms. In another example, the first classification indicates an un-rotated utility pole having a single cross-arm, and the second classification indicates a utility pole having a single cross-arm and rotated 90 degrees in the object-specific image. Additional classifications can include, but are not limited to, a utility pole having a single cross-arm and rotated 270 degrees in the object-specific image; a utility pole having two cross-arms and rotated 90 degrees in the object-specific image; a utility pole having two cross-arms and rotated 270 degrees in the object-specific image; a straight utility pole; a bent utility pole; an un-rotated straight utility pole; a straight utility pole rotated 180 degrees in the object-specific image; an un-rotated bent utility pole; and a bent utility pole rotated 180 degrees in the object-specific image.

In another example, the particular type of object is a transformer. The first classification can indicate a transformer having cooling fins, and the second classification can indicate a transformer without cooling fins. In another example, the first classification indicates an un-rotated transformer having cooling fins, and the second classification indicates a transformer having cooling fins and rotated 180 degrees in the object-specific image. In another example, the first classification indicates an un-rotated transformer without cooling fins; and the second classification indicates a transformer without cooling fins and rotated 180 degrees in the object-specific image.

Referring back to FIG. 3A, in step 320, the system performs meta-learning to update a set of meta parameters. For example, the system can use any appropriate meta-learning algorithms to generate the meta parameters. In general, the meta-learning process includes training the classification neural network on the initial training tasks to generate updated values of a set of network parameters for the classification neural network, and updating the set of meta parameters based at least on the updated values for the network parameters. Thus, the system can generate the meta parameters by extracting prior knowledge from the initial training tasks based on the meta-learning datasets, and in a next step, use the meta parameters along with labeled training examples to train the classification neural network to perform the intended classification task, i.e., the anomaly detection task.

In one example, the system can use a model agnostic meta-learning (MAML) approach. In this approach, the system directly optimizes the meta parameters to initialize the classification neural network for adapting to a new task given a small number of labeled training examples on the new task. That is, based on the meta-learning datasets for the initial training tasks, the system optimizes a set of cross-task initiation parameters to provide the initial values for the target network parameters of the classification neural network. The meta parameters are the cross-task initiation parameters in this case.

In an example process of MAML, the system defines a set of initial parameters θ, and repeatedly samples a task t from the initial training tasks. For each sampled task t, the system initializes the values of the network parameters at θ, and performs k (e.g., k<10) steps of gradient descent on a training batch of the respective meta-learning dataset of task t. At the end of k steps, the values of the network parameters are updated to ϕ. The system evaluates the loss on a testing batch from the respective meta-learning dataset for task t at parameter values ϕ, and calculates the derivative of the loss with respect to the initial parameters θ. The system uses the derivative with respect to θ to update the initialization parameters θ, discards the ϕ learned for the specific task, and starts the process over again with a new sampled task, initializing the values of the network parameters with the updated θ values.

In a particular example, the system can adopt a meta-learning algorithm ("Reptile") to efficiently computing the updated θ values. Briefly, for each sampled task, the system obtains ϕ, the network parameters reached after k steps of gradient descent on the task, and computes the update to the initial parameters θ based on the total movement in the parameter space over those k updates, or (□-□). This approach allows computing the updated θ without using an inner and outer loop optimization which is computationally expensive.

In step 330, the system obtains a set of labeled training examples for an anomaly-detection task, where each labeled training example includes a training input image and a label indicating at least whether an object depicted in the training input image has an anomaly feature.

In some implementations, the object depicted in the training input image is an electrical asset, and the anomaly feature is a defect in the electrical asset that causes malfunction or potential hazard. Examples of these defects include broken wires, broken or cracked cross-arms, bent poles, damages (e.g. shown as being deformed or as burn marks) in a transformer, an insulator, a lightning arrestor, a fuse, and so on.

In step 340, the system performs training of the classification neural network using the labeled training examples and the values of the meta parameters. That is, the system determines target values for the network parameters for the classification neural network to perform the anomaly-classification task, based at least on the values for the set of meta parameters and using the set of labeled training examples.

In some implementations, the meta parameters are initialization parameters for the classification neural network. To generate the target values for the network parameters, the system initializes the network parameters with the values of the meta parameters determined by the meta-learning, updates the values of the network parameters by training the classification neural network on the set of labeled training examples, and determines the target values for the network parameters using the updated values of the network parameters after performing training of the classification neural network on the set of labeled training examples.

In some implementations, the system can use the classification neural network according to the target network parameters to perform anomaly detection. That is, the system can process an image using the classification neural network according to the target network parameters to generate a classification result indicating whether an object depicted by the image is associated with the one or more anomaly features.

Figure 3C:
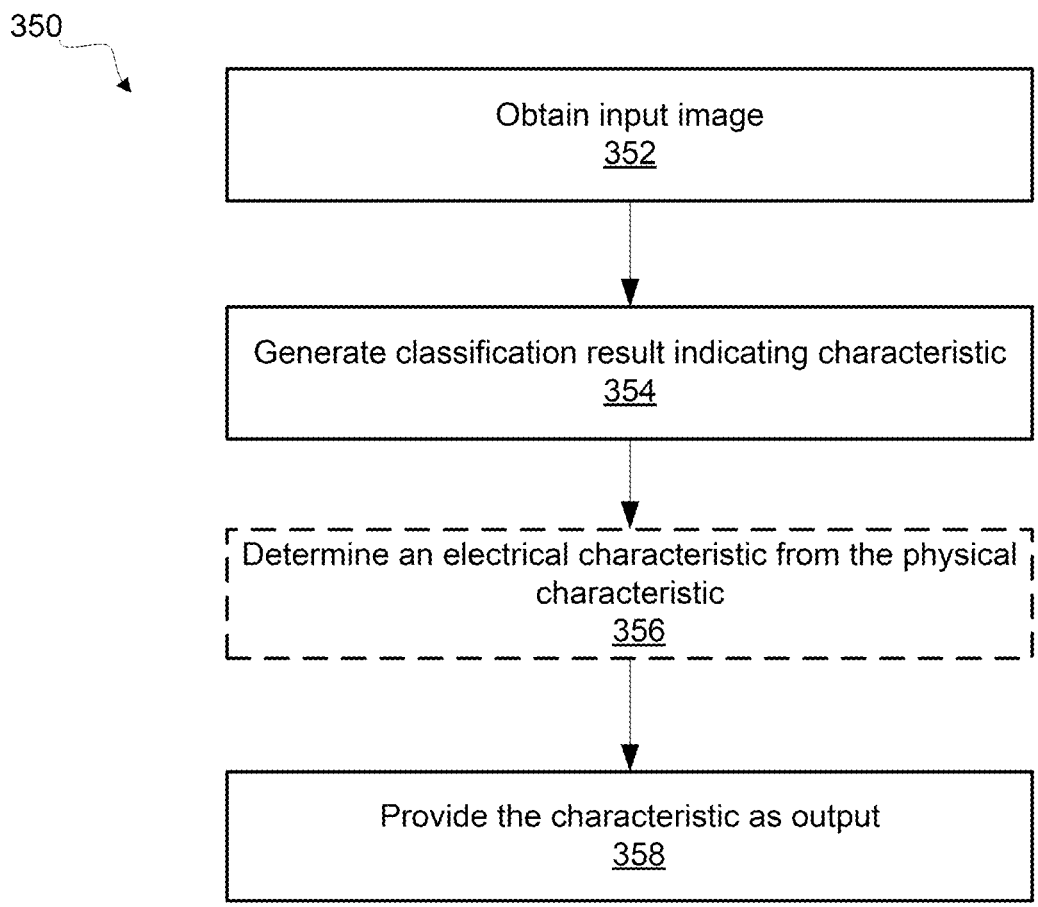
FIG. 3C is a flow diagram illustrating an example process for object characteristic feature detection.

FIG. 3C is a flow diagram illustrating an example process 350 for using a classification neural network to generate a classification result specifying characteristic features of an object, such as an electric asset. For convenience, the process 350 will be described as being performed by a system of one or more computers located in one or more locations. For example, a neural network training system, e.g., the neural network training system 100 of FIG. 1, appropriately programmed in accordance with this specification, can perform the process 350.

At 352, the system obtains at least one image that includes a depiction of an electrical asset. At 354, the system processes image as input to a classification neural network to generate a classification result indicating a characteristic of the electrical asset. The classification neural network has been trained using a training method, for example, using the training method described with reference to FIG. 3A.

In some implementations, the characteristic indicated by the classification result can be a physical characteristic, such as a thickness level of an insulator. In this case, the system further performs step 356 for determining an electrical characteristic from the physical characteristic. For example, the system can correlate the physical characteristic (e.g., the thickness level of the insulator) to the electrical characteristic (e.g., the power rating of the insulator) using a correlation model, regression model, or a lookup table. The thickness of an insulated can be correlated to the power, voltage, or current rating of a wire supported on the insulator. As another example, a detected distance between multiple wires can be correlated to the power rating or voltage rating of the wires.

At 358, the system provides the electrical characteristic as output. For example, the system can use the detected electrical characteristic to update computer model of an electric grid. For example, a street view image of a powerline pole can be used to determine or verify power ratings of wires, insulators, transformers or other equipment attached to the pole. For example, the process 300 can be used to update or correct power grid models used by power companies for grid planning, upgrading equipment, maintaining equipment, etc.

Figure 4:
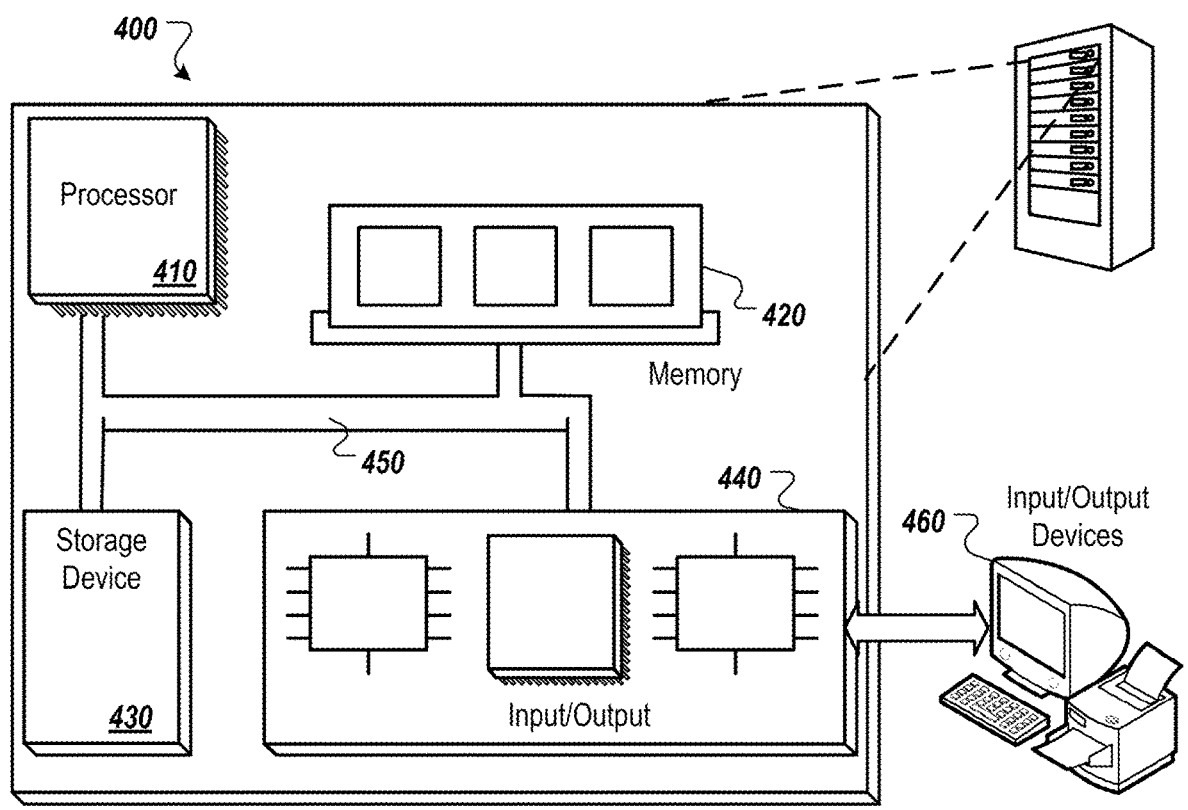
FIG. 4 shows an example computer system for performing operations described in the present specification.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (for example, a cloud storage device), or some other large capacity storage device.

The input/output device 440 provides input/output operations for the system 400. In one implementation, the input/output device 440 can include one or more network interface devices, for example, an Ethernet card, a serial communication device, for example, a RS-232 port, and/or a wireless interface device, for example, a 502.11 card. In another implementation, the input/output device can include driver devices configured to receive data and send output data to other input/output devices, for example, keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, that is, one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, for example, an FPGA (field programmable gate array) or an ASIC (application-specific integrated circuit). The apparatus can optionally include, in addition to hardware, code that creates an execution environment for computer programs, for example, code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on data and generating output. The processes and logic flows can also be performed by special purpose logic circuitry, for example, an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device, for example, a universal serial bus (USB) flash drive, to name just a few.

Computer-readable media suitable for storing computer program instructions and data include all forms of non-volatile memory, media and memory devices, including by way of example semiconductor memory devices, for example, EPROM, EEPROM, and flash memory devices;

magnetic disks, for example, internal hard disks or removable disks; magneto-optical disks; and CD-ROM and DVD-ROM disks.

To provide for interaction with a user, embodiments of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of messages to a personal device, for example, a smartphone that is running a messaging application and receiving responsive messages from the user in return.

Data processing apparatus for implementing machine learning models can also include, for example, special-purpose hardware accelerator units for processing common and compute-intensive parts of machine learning training or production, that is, inference, workloads.

Machine learning models can be implemented and deployed using a machine learning framework, for example, a TensorFlow framework.

Embodiments of the subject matter described in this specification can be implemented in a computing system that includes a back-end component, for example, as a data server, or that includes a middleware component, for example, an application server, or that includes a front-end component, for example, a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, for example, a communication network. Examples of communication networks include a local area network (LAN) and a wide area network (WAN), for example, the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, for example, an HTML page, to a user device, for example, for purposes of displaying data to and receiving user input from a user interacting with the device, which acts as a client. Data generated at the user device, for example, a result of the user interaction, can be received at the server from the device.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A classification neural network training method comprising:
generating, from a set of object-specific data, one or more meta-learning datasets for one or more respective initial training tasks, wherein generating each meta-learning dataset for the respective initial training task comprises:
generating similarity measures comprising by performing a similarity search on the set of object-specific input data,
selecting from the set of object-specific input data, based on the similarity measures, at least a first sub-set of object-specific data each representing an object having a first feature and a second sub-set of object-specific data each representing an object having a second feature, and
generating, for each object-specific datum in the first sub-set of object-specific data, a first label indicating that the object represented in the object-specific datum belongs to a first classification, and generating, for each object-specific datum in the second sub-set of object-specific input data, a second label indicating that the object represented in the object-specific datum belongs to a second classification;
determining values for a set of meta parameters by performing meta-learning with a classification neural network on the one or more meta-learning datasets;
obtaining a set of labeled training examples for a characteristic-detection task, wherein each labeled training example includes a training input and a label indicating at least whether an object represented in the training input has a characteristic feature; and
determining, based at least on one of the values for the set of meta parameters and using the set of labeled training examples, target values for network parameters for the classification neural network.

2. The method of claim 1, wherein the set of object-specific data comprises a set of object-specific images, where each object specific image depicts a particular type of object, and
wherein generating the similarity measures comprises performing a visual similarity search on the set of object-specific images.

3. The method of claim 1, wherein the set of object-specific data comprises a set of object-specific audio recordings, where each object-specific audio recording comprises operating sound of a particular type of object, and
wherein generating the similarity measures comprises performing the similarity search on time-domain or frequency-domain data of the set of object-specific audio recordings.

4. The method of claim 2, further comprising:
processing an image using the classification neural network according to the target values for the network parameters to generate a classification result indicating whether an object depicted by the image is associated with one or more anomaly features.

5. The method of claim 4, wherein the first feature and the second feature are different from the one or more anomaly features, and wherein the particular type of object is an electrical asset, and the characteristic feature comprises one or more defects on the electrical asset.

6. The method of claim 5, wherein the defects include: a broken wire, a broken or cracked cross-arm, a bent pole, a damaged or rusty transformer, a damaged insulator, a damaged fuse, or a damaged lightning arrestor.

7. The method of claim 1, further comprising:
selecting the set of object-specific images from a plurality of images based on a detection result generated by processing each of the plurality of images using an object detection model configured to at least detect a particular type of object from an input image.

8. The method of claim 7, wherein the object detection model is further configured to generate a cropped image that contains the particular type of object from an input image.

9. The method of claim 2, wherein generating the similarity measures by performing the visual similarity search on the set of object-specific images comprises:
generating a respective feature vector for each object-specific image by processing the object-specific image using a feature extraction neural network; and
computing the similarity measures as distance metrics between pairs of the respective feature vectors of the object-specific images in a feature space.

10. The method of claim 9, wherein the distance metrics are cosine similarities.

11. The method of claim 9, wherein selecting from the set of object-specific images, based on the similarity measures, the first sub-set and the second sub-set of object-specific images comprises:
identifying, from the set of object-specific images, a plurality of object-specific images with respective feature vectors having distance metrics from a first feature vector below a first threshold as the first set of object-specific images; and
identifying, from the set of object-specific images, a plurality of object-specific images with respective feature vectors having distance metrics from a second feature vector below a second threshold as the second set of object-specific images, wherein:
the distance metric between the first feature vector and the second feature vector is above a third threshold.

12. The method of claim 1, wherein determining the values for the set of meta parameters comprises:
updating values of the network parameters of the classification neural network by training the classification neural network on a plurality of training examples from the one or more meta-learning datasets; and
determining the values of the set of meta parameters based at least on the updated values of the network parameters.

13. The method of claim 12, wherein:
the set of meta parameters are initialization parameters for the classification neural network; and
generating the target values for the network parameters comprises:
initializing the network parameters with the values of the meta parameters determined by the meta-learning,
updating the values of the network parameters by training the classification neural network on the set of labeled training examples, and
determining the target values for the network parameters using the updated values of the network parameters after performing training of the classification neural network on the set of labeled training examples.

14. The method of claim 13, wherein determining values for the set of meta parameters comprises:
initializing the meta parameters to initial values;
for each of a plurality of training iterations, performing:
selecting a task from the initial training tasks, initializing the set of network parameters to current values of the meta parameters, performing a plurality of training steps, comprising, for each training step, updating the values of the network parameters based on a first batch of training examples from the meta-learning dataset for the selected task,
evaluating a loss using the classification neural network and in accordance with the updated values of the network parameters on a second batch of training examples from the meta-learning dataset of the selected task, and
updating the current values of the meta parameters based on the loss with respect to the meta parameters; and
determining the values for the set of meta parameters as the updated values of the meta parameters after performing the plurality of training iterations.

15. The method of claim 13, wherein performing meta-learning of the classification neural network to update the set of meta parameters based on the one or more meta-learning datasets comprises:
assigning initial values to the meta parameters; and
for each of a plurality of training episodes, performing:
selecting a task from the initial training tasks,
assigning values of the set of network parameters to current values of the meta parameters,
performing a plurality of training steps, comprising, for each training step, updating the values of the set of network parameters based on a training example from the respective meta-learning dataset of the selected task, and
after performing the plurality of training steps, updating values of the meta parameters based at least on differences between the current values of the meta parameters and the updated values of the network parameters; and determining the values for the set of meta parameters as the updated values of the meta parameters after performing the plurality of training iterations.

16. The method of claim 1, wherein the classification neural network has one or more convolution layers.

17. The method of claim 16, wherein the classification neural network further includes a respective head for each of a plurality of object types that generates a respective classification output for the object type.

18. The method of claim 17, wherein the one or more convolution layers include a first set of convolution layers with fixed network parameters that are not updated using the labeled training examples and a second set of convolution layers with network parameters that are updated using the labeled training examples.

19. One or more non-transitory computer storage media storing instructions that when executed by one or more computers cause the one or more computers to perform operations for training a classification neural network, the operations comprising:
   generating, from a set of object-specific data one or more meta-learning datasets for one or more respective initial training tasks, wherein generating each meta-learning dataset for the respective initial training task comprises:
   generating similarity measures comprising by performing a similarity search on the set of object-specific input data,
   selecting from the set of object-specific input data, based on the similarity measures, at least a first sub-set of object-specific data each representing an object having a first feature and a second sub-set of object-specific data each representing an object having a second feature, and
   generating, for each object-specific datum in the first sub-set of object-specific data, a first label indicating that the object represented in the object-specific datum belongs to a first classification, and generating, for each object-specific datum in the second sub-set of object-specific input data, a second label indicating that the object represented in the object-specific datum belongs to a second classification;
   determining values for a set of meta parameters by performing meta-learning with a classification neural network on the one or more meta-learning datasets;
   obtaining a set of labeled training examples for a characteristic-detection task, wherein each labeled training example includes a training input and a label indicating at least whether an object represented in the training input has a characteristic feature; and
   determining, based at least on one of the values for the set of meta parameters and using the set of labeled training examples, target values for network parameters for the classification neural network.

20. A system comprising:
at least one processor; and
a data store coupled to the at least one processor having instructions stored thereon which, when executed by the at least one processor, causes the at least one processor to perform operations comprising:
   generating, from a set of object-specific data one or more meta-learning datasets for one or more respective initial training tasks, wherein generating each meta-learning dataset for the respective initial training task comprises:
   generating similarity measures comprising by performing a similarity search on the set of object-specific input data,
   selecting from the set of object-specific input data, based on the similarity measures, at least a first sub-set of object-specific data each representing an object having a first feature and a second sub-set of object-specific data each representing an object having a second feature, and
   generating, for each object-specific datum in the first sub-set of object-specific data, a first label indicating that the object represented in the object-specific datum belongs to a first classification, and generating, for each object-specific datum in the second sub-set of object-specific input data, a second label indicating that the object represented in the object-specific datum belongs to a second classification;
   determining values for a set of meta parameters by performing meta-learning with a classification neural network on the one or more meta-learning datasets;
   obtaining a set of labeled training examples for a characteristic-detection task, wherein each labeled training example includes a training input and a label indicating at least whether an object represented in the training input has a characteristic feature; and
   determining, based at least on one of the values for the set of meta parameters and using the set of labeled training examples, target values for network parameters for the classification neural network.

* * * * *